US010873988B2

(12) United States Patent
Jeong et al.

(10) Patent No.: US 10,873,988 B2
(45) Date of Patent: *Dec. 22, 2020

(54) METHOD AND APPARATUS FOR PROVIDING NEXT GENERATION NETWORK SERVICE IN HETEROGENEOUS NETWORK ENVIRONMENT

(71) Applicant: SK TELECOM CO., LTD., Seoul (KR)

(72) Inventors: Sangsoo Jeong, Seoul (KR); Chang-Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,415

(22) Filed: Oct. 23, 2019

(65) Prior Publication Data

US 2020/0059984 A1 Feb. 20, 2020

Related U.S. Application Data

(63) Continuation of application No. 16/186,010, filed on Nov. 9, 2018, now Pat. No. 10,499,445, which is a (Continued)

(30) Foreign Application Priority Data

May 12, 2016 (KR) ........................ 10-2016-0058193

(51) Int. Cl.
*H04W 76/16* (2018.01)
*H04L 29/06* (2006.01)
(Continued)

(52) U.S. Cl.
CPC ............... *H04W 76/16* (2018.02); *H04L 1/18* (2013.01); *H04L 29/06* (2013.01); *H04L 29/08* (2013.01); *H04W 88/10* (2013.01); *H04W 92/02* (2013.01)

(58) Field of Classification Search
CPC ..... H04W 76/10; H04W 76/15; H04W 76/16; H04W 76/19; H04W 36/0027;
(Continued)

(56) References Cited

U.S. PATENT DOCUMENTS

2005/0166043 A1  7/2005  Zhang et al.
2008/0304458 A1* 12/2008  Aghvami ................ H04L 69/08
                                                    370/338
(Continued)

FOREIGN PATENT DOCUMENTS

CN    101552977 A   10/2009
EP    2787763 A1   10/2014
(Continued)

OTHER PUBLICATIONS

European Search Report dated Oct. 29, 2019 for counterpart European Patent Application No. 17796314.7.
(Continued)

*Primary Examiner* — Jean A Gelin
(74) *Attorney, Agent, or Firm* — Hauptman Ham, LLP

(57) ABSTRACT

A method and an apparatus are disclosed for providing a next-generation network service in a heterogeneous network environment. The present disclosure in some embodiments provides a method and an apparatus, which can operate a conventional network and a next-generation network in an interworking arrangement with high reliability, and can process high-speed data communications by using the next-generation network.

6 Claims, 17 Drawing Sheets

Related U.S. Application Data continuation of application No. PCT/KR2017/004583, filed on Apr. 28, 2017.

(51) Int. Cl.
  H04L 1/18 (2006.01)
  H04L 29/08 (2006.01)
  *H04W 88/10* (2009.01)
  *H04W 92/02* (2009.01)

(58) Field of Classification Search
  CPC ......... H04W 36/0061; H04W 36/0069; H04W 36/08; H04W 40/24; H04W 40/36; H04W 92/02
  See application file for complete search history.

(56) References Cited

U.S. PATENT DOCUMENTS

| | | | |
|---|---|---|---|
| 2011/0305153 A1 | 12/2011 | Lee et al. | |
| 2012/0331286 A1 | 12/2012 | Choi et al. | |
| 2013/0229931 A1 | 9/2013 | Kim | |
| 2014/0335869 A1* | 11/2014 | Choi | H04W 40/36 455/438 |
| 2015/0281981 A1 | 10/2015 | Msallem et al. | |
| 2015/0289200 A1 | 10/2015 | Nylander et al. | |
| 2015/0312126 A1* | 10/2015 | Deshpande | H04L 43/0894 709/216 |
| 2015/0358866 A1* | 12/2015 | Xu | H04W 36/38 370/331 |
| 2016/0044548 A1* | 2/2016 | Choi | H04W 36/0061 370/331 |
| 2016/0255665 A1* | 9/2016 | Futaki | H04W 72/1247 370/329 |
| 2016/0338140 A1* | 11/2016 | Zhang | H04W 76/27 |
| 2016/0373972 A1* | 12/2016 | Vesely | H04W 36/0027 |
| 2017/0013668 A1* | 1/2017 | Chang | H04W 76/19 |
| 2017/0086242 A1* | 3/2017 | Ahn | H04W 56/0045 |
| 2017/0099621 A1* | 4/2017 | Michaelsen | H04W 36/08 |
| 2017/0099693 A1* | 4/2017 | Deng | H04W 76/15 |
| 2017/0127473 A1* | 5/2017 | Virtej | H04W 76/38 |
| 2018/0092118 A1* | 3/2018 | Kim | H04W 28/0278 |
| 2018/0167854 A1 | 6/2018 | Enomoto et al. | |
| 2019/0098684 A1* | 3/2019 | Tamura | H04M 15/66 |
| 2019/0110230 A1 | 4/2019 | Enomoto et al. | |

FOREIGN PATENT DOCUMENTS

| | | |
|---|---|---|
| WO | 2015020475 A1 | 2/2015 |
| WO | 2015-069551 A1 | 5/2015 |
| WO | 2015-138908 A2 | 9/2015 |
| WO | 2016-047374 A1 | 3/2016 |

OTHER PUBLICATIONS

Japanese Office Action dated Dec. 18, 2019, in connection with the Japanese Patent Application No. 2018-559759.

International Search Report dated Jul. 28, 2017, in connection with corresponding International Patent Application No. PCT/KR2017/004583.

European Office Action for corresponding European Application No. 17796314.7 dated Sep. 23, 2020, citing the above reference.

Indian Office Action for corresponding Indian Application No. 201827044695 dated Sep. 30, 2020, citing the above reference.

* cited by examiner

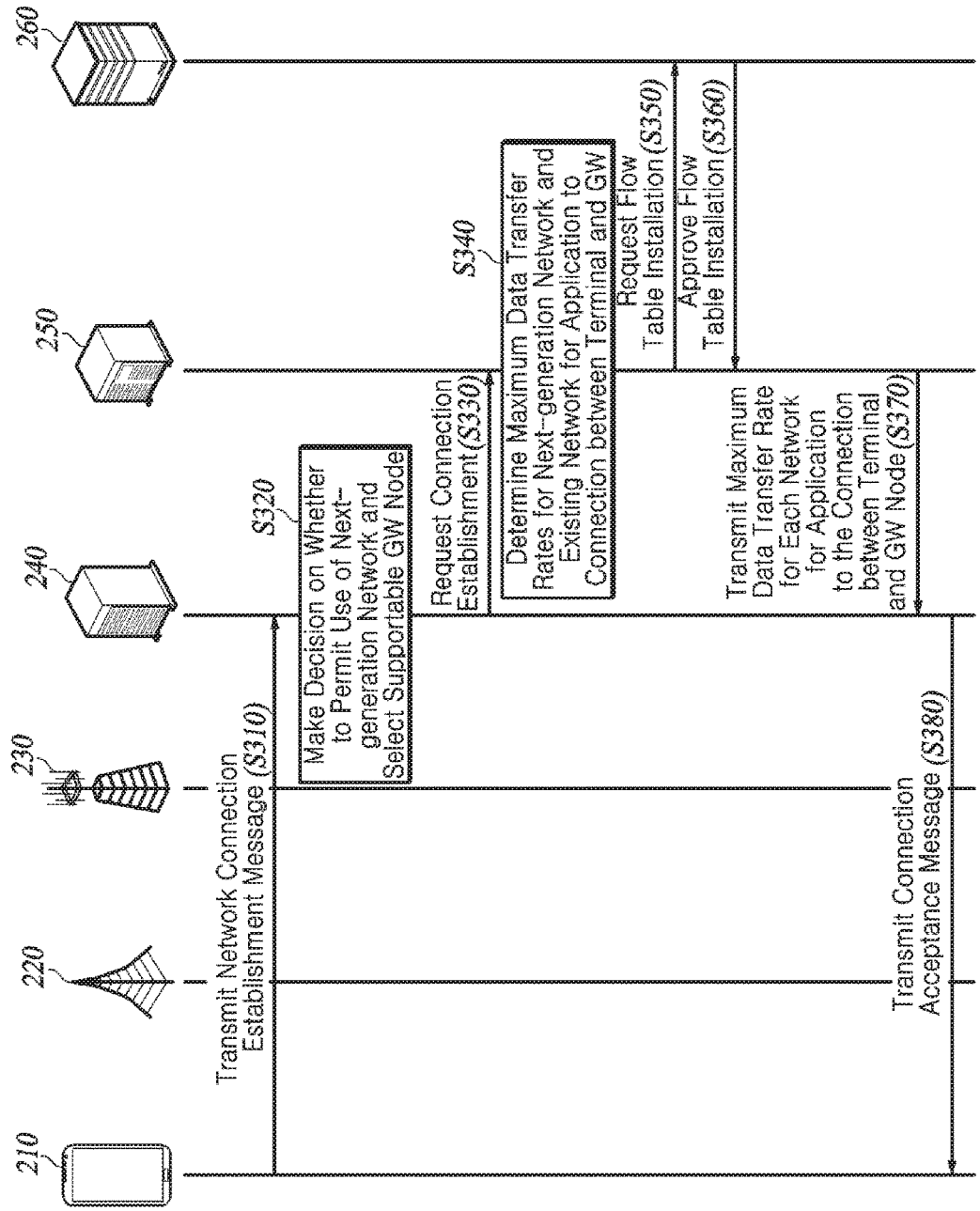

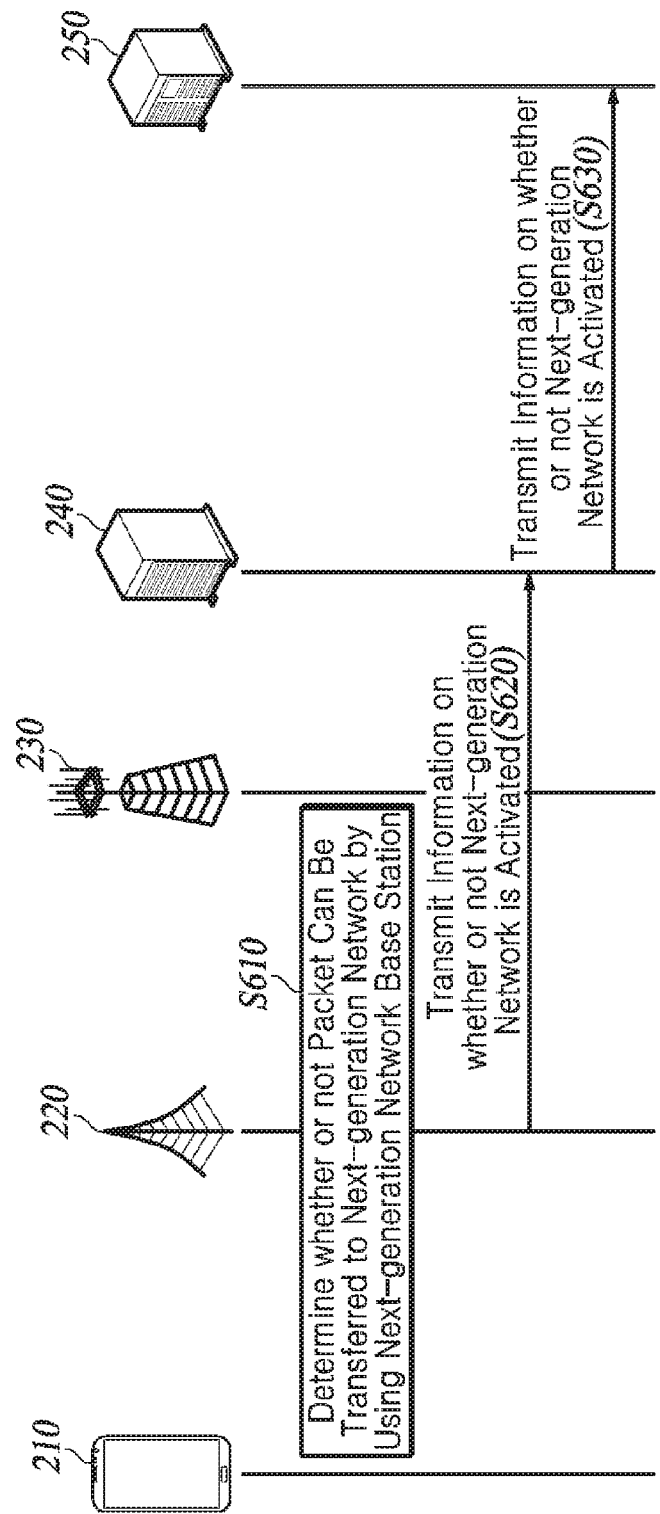

METHOD AND APPARATUS FOR PROVIDING NEXT GENERATION NETWORK SERVICE IN HETEROGENEOUS NETWORK ENVIRONMENT

CROSS-REFERENCE TO RELATED APPLICATION

The present application is a continuation of U.S. patent application Ser. No. 16/186,010, filed Nov. 9, 2018, which is a continuation of International Application No. PCT/KR2017/004583, filed Apr. 28, 2017, which is based upon and claims the benefit of priority from Korean Patent Application Nos. 10-2016-0058193, filed on May 12, 2016. The disclosure of the above-listed application is hereby incorporated by reference herein in their entirety.

TECHNICAL FIELD

The present disclosure in some embodiments relates to a method and an apparatus for providing a next-generation network system in an interworking arrangement with an existing network system in a heterogeneous network environment.

BACKGROUND

The statements in this section merely provide background information related to the present disclosure and do not necessarily constitute prior art.

FIGS. 1A and 1B are diagrams of a protocol structure for supporting a dual connectivity technology employed by a conventional network.

A Packet Data Convergence Protocol (PDCP) layer supports efficient data transfer by using network protocols such as IPv4 or IPv6. In particular, for efficient transmission of IP packets, the PDCP layer uses a header compression method for compressing header information of packets.

A Radio Link Control (RLC) layer, which is subordinate to the PDCP layer, constitutes an RLC Packet Data Unit (PDU) of a size suitable for radio transmission, and it performs an Automatic Repeat Request (ARQ) function that is responsible for retransmission of a lost RLC PDU during transmission. The transmit-side RLC layer constructs an RLC PDU suitable for transmission by using a segmentation and concatenation function of an RLC Service Data Unit (SDU) passed from the higher level. The receive-side RLC layer performs a data reassembly function to reconstruct the original RLC SDU. The RLC layer has an RLC buffer for storing RLC SDUs or RLC PDUs.

A MAC layer transfers data received from the RLC layer to a terminal or a gateway.

FIG. 1A is a protocol structure for supporting a dual connectivity technology by using a core network (CN) split method.

The structure of the protocol using the CN split method has relatively low complexity. Therefore, in the conventional network, such protocol structure can be introduced without major change compared to the earlier protocol structure prior to supporting the dual connectivity technology. The structure of the protocol using the CN splitting method is equivalent to a conventional protocol structure with only a specific bearer passed to another base station (Secondary eNodeB, SeNB).

The master base station (Master eNodeB or MeNB) receives only an MCG bearer. The MCG bearer corresponds to a bearer which transfers data by using only the radio resources of the master base station. As with the master base station, the secondary base station (Secondary eNodeB or SeNB) receives only an SCG bearer. The SCG bearer, which has the same structure as the MCG bearer, is adapted to transfer data by using only the radio resources of the secondary base station.

FIG. 1B is a protocol structure for supporting a dual connectivity technology using the PDCP splitting method.

The dual connectivity technology using PDCP splitting method is a technology for separating bearers from the PDCP layer of one base station. Unlike the existing protocol structure, the structure of the protocol using the PDCP splitting method has two RLCs connected to one PDCP. This protocol structure allows one bearer to transfer data by using both the master base station and the secondary base station.

The master base station receives split bearers along with MCG bearers. A split bearer is a bearer that transfers data by using radio resources of the master base station as well as the secondary base station.

The existing network (LTE) has greatly improved the data transfer rate by using such dual connectivity technology. However, in the next-generation network, the maximum possible data transfer rate compared with the existing network is several tens of times higher, and this fact makes it difficult to provide the next-generation network simply with the system architectures that have served the existing networks.

Therefore, there is a growing need for a new network structure in which an existing network and a next-generation network cooperate to provide an appropriate network according to the state of the terminal or the network.

DISCLOSURE

Technical Problem

The present disclosure in some embodiments seeks to provide a method and apparatus which can reliably process high-speed data communication by using a next-generation network while operating in conjunction with an existing network.

Further, the present disclosure in some embodiments aims to provide a method and an apparatus for selectively providing an existing network or a next-generation network to a terminal or a gateway in consideration of a state of the network or a state of the terminal.

SUMMARY

At least one aspect of the present disclosure provides a method performed by a base station control apparatus for controlling a base station of a mobile communication system including a plurality of heterogeneous networks of different generations. The method includes receiving, by the base station control apparatus, a network connection establishment message including information on utilization of a first network from a terminal, and deciding, by the base station control apparatus, whether to approve or disapprove utilization of the first network by the terminal by using previously stored information on the terminal and the information on utilization of the first network, and selecting, by the base station control apparatus, one between a gateway capable of providing a mobile communication service based on the first network to the terminal, and a gateway capable of providing a second network to the terminal, depending on whether utilization of the first network is determined to be approved or disapproved, and performing, by the base station control apparatus, a first transmission of a network connection establishment request to the gateway selected in the selecting.

Another aspect of the present disclosure provides an apparatus for controlling a base station of a mobile communication system including a plurality of heterogeneous networks of different generations. The apparatus includes a communication unit, a data storage unit and a control unit. The communication unit is configured to receive from a terminal, a network connection establishment message including information on utilization of a first network, and to transmit a network connection establishment request to a selected gateway. The data storage unit is configured to store information on the terminal. The control unit is configured to decide whether to approve or disapprove utilization of the first network by the terminal by using the information on the terminal and the information on utilization of the first network, and to select one between a gateway capable of providing the first network to the terminal, and a gateway capable of providing a second network to the terminal, depending on whether utilization of the first network by the terminal is determined to be approved or disapproved.

Yet another aspect of the present disclosure provides a method performed by a control plane gateway for determining a maximum data transfer rate in a mobile communication system including a plurality of heterogeneous networks of different generations. The method includes receiving, by the control plane gateway, information on a network connection establishment request including information on utilization of a first network by a terminal, from a base station control apparatus, and determining, by the control plane gateway, a maximum data transfer rate for the first network and a maximum data transfer rate for the second network to be provided to the terminal, by referring to the information on the utilization of the first network by the terminal, and performing a transmission by the control plane gateway. The performing of the transmission includes transmitting a flow table installation message to a user plane gateway so that traffic is transferred between the terminal and the user plane gateway, and transmitting to the base station control apparatus, a connection acceptance message including a determined maximum data transfer rate for the first network and a determined maximum data transfer rate for the second network.

Yet another aspect of the present disclosure provides a method of operating a terminal by applying a maximum data transfer rate in a mobile communication system including a plurality of heterogeneous networks of different generations. The method includes receiving, by the terminal, a maximum data transfer rate for a first network, a maximum data transfer rate for a second network, and a packet, and performing, by the terminal, a first determination on whether or not the packet is a traffic that utilizes the first network, and performing, by the terminal, a second determination on whether or not the mobile communication system is activated utilizing the first network, and deciding, by the terminal, whether to control the traffic either by utilizing the first network by applying the maximum data transfer rate for the first network, or by utilizing the second network by applying the maximum data transfer rate for the second network, depending on results of the performing of the first determination and the performing of the second determination.

Yet another aspect of the present disclosure provides a terminal apparatus for applying a maximum data transfer rate in a mobile communication system including a plurality of heterogeneous networks of different generations. The terminal apparatus includes a communication unit and a control unit. The communication unit is configured to receive a maximum data transfer rate for a first network, a maximum data transfer rate for a second network, and a packet. The control unit is configured to make decisions on whether or not the packet is a traffic that utilizes the first network and whether or not the mobile communication system is activated utilizing the first network, and to decide, depending on the results of the decisions, whether to control the traffic either by utilizing the first network by applying the maximum data transfer rate for the first network, or by utilizing the second network by applying the maximum data transfer rate for the second network.

Yet another aspect of the present disclosure provides a method of operating a base station of a mobile communication system including a plurality of heterogeneous networks of different generations. The method includes receiving, by the base station, a network connection establishment message for a first network, including information on utilization of the first network from a terminal, and determining whether or not the base station supports interworking with the first network upon receiving the connection establishment message, and deciding whether to include the information on utilization of the first network in the connection establishment message depending on whether or not the base station supports interworking with the first network, and transmitting a conclusive connection establishment message after the deciding, to a base station control apparatus.

Yet another aspect of the present disclosure provides a base station apparatus of a mobile communication system including a plurality of heterogeneous networks of different generations. The base station apparatus includes a communication unit and a control unit. The communication unit is configured to receive a connection establishment message for a first network, including information on utilization of the first network from a terminal, and to transmit a conclusive connection establishment message after deciding whether to incorporate the information on utilization of the first network, to a base station control apparatus. The control unit is configured to determine, when the communication unit receives the connection establishment message, whether the control unit supports interworking with the first network, and to decide whether to include the information on the utilization of the first network in the connection establishment message depending on whether the control unit supports the interworking with the first network.

Yet another aspect of the present disclosure provides a method performed by a terminal for notifying whether a network is activated or deactivated in a mobile communication system including a plurality of networks of different generations, which are provided in an interworking arrangement respectively. The method includes determining, by the terminal, whether a first network that is in connection with the terminal is inactivated, and determining, by the terminal when the first network is inactivated, whether there is an uplink packet to be transmitted to a base station, and transmitting, by the terminal when there is an uplink packet to be transmitted to the base station, the uplink packet with a state of the first network being incorporated in a header of the uplink packet, to the base station, and generating, by the terminal when there is no uplink packet to be transmitted to the base station, a dummy packet for notifying the state of the first network, and transmitting the dummy packet to the base station.

Yet another aspect of the present disclosure provides a method performed by a base station for notifying whether a network is activated or deactivated in a mobile communication system including a plurality of heterogeneous networks of different generations, which are provided in an interworking arrangement respectively. The method includes determining, by the base station, whether a first network that is in connection with the terminal is inactivated, and transmitting, by the base station, information on whether the first network is inactivated to a base station control apparatus.

Advantageous Effects

As described above, one aspect of the present disclosure can reliably process high-speed data communication by using a next-generation network while operating in conjunction with an existing network.

Another aspect of the present disclosure can selectively provide an existing network or a next-generation network to a terminal or a gateway in consideration of a state of the network or a state of the terminal.

BRIEF DESCRIPTION OF THE DRAWINGS

FIG. 3 is a flowchart of a process of providing a network to a terminal by a system architecture according to at least one embodiment of the present disclosure.

FIG. 6 is a flowchart of a process that a system architecture according to at least one embodiment of the present disclosure determines whether or not the next-generation network is activated.

DETAILED DESCRIPTION

Figure 1A:
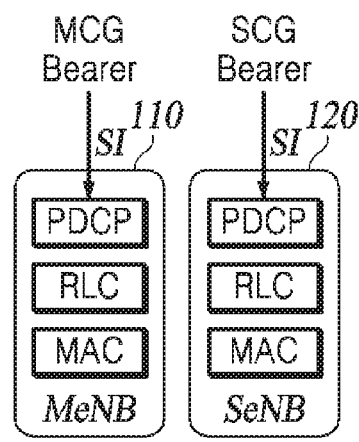
FIGS. 1A and 1B are diagrams of a protocol structure for supporting a dual connectivity technology employed by a conventional network.
Figure 1B:
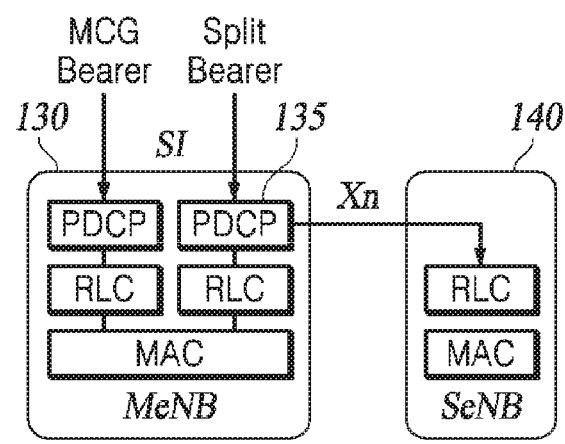

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to units for processing at least one function or operation, which may be implemented by hardware, software, or a combination thereof.

In order to explain embodiments of the present disclosure, connectivity or a communication service using a network provided for a user terminal can be easily replaced with the term network. In addition, the next-generation network may include all existing technologies including long term evolution (LTE) and evolved packet core (EPC), that is, technologies that appeared after the fourth generation network. For example, the next-generation network may include a fifth generation communication network or a network utilizing a new radio access technology (NR) for a fifth generation communication network.

Figure 2:
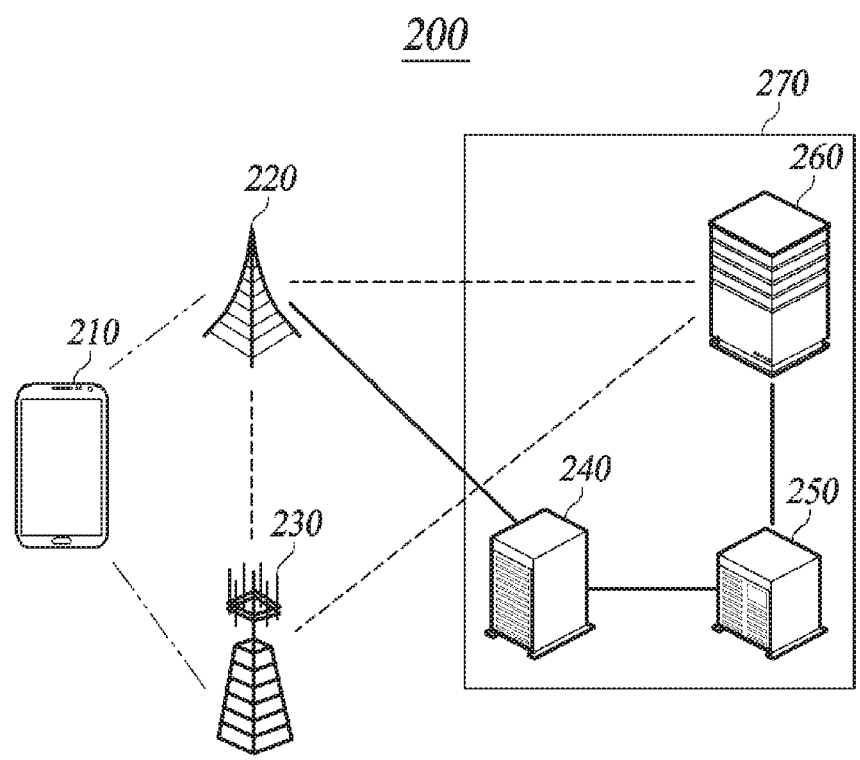
FIG. 2 is a diagram of a system architecture in which an existing network and a next-generation network are interworking in accordance with at least one embodiment of the present disclosure.

FIG. 2 is a diagram of a system architecture in which an existing network and a next-generation network are interworking in accordance with at least one embodiment of the present disclosure.

Referring to FIG. 2, a system architecture 200 according to some embodiments of the present disclosure includes a terminal 210, an existing network base station 220, a next-generation network base station 230, a base station control node 240, a control plane gateway 250 and a user plane gateway 260.

The terminal 210 is a device that attempts to use a wireless network by connecting to a cellular network by using the existing network base station 220 or the next-generation network base station 230. The terminal 210 includes any smart devices that can use wireless networks such as smart phones, tablet PCs, smart watches, and includes others such as notebook computers, laptop computers, personal digital assistants (PDAs) and the like.

The base stations 220, 230 serve as the connection nodes of the cellular network, and provide the wireless connection to the terminal 210 that attempts to connect to the cellular network. In other words, the base stations 220, 230 support connection between the terminal 210 and a core network 270.

Serving as a component for performing the signaling and control functions, the base station control node 240 manages terminal mobility such as access of the terminal 210 to the network, allocation of network resources, and the like. The base station control node 240 performs the above-described functions on a control plane related to a subscriber and session management. More specifically, the base station control node 240 serves to decide whether or not to provide the next-generation network to the terminal, and if yes, determine the kind of control plane gateway to provide the next-generation network to the terminal, and the like. The base station control node 240 may be implemented as, but not limited to, a mobility management entity (MME), and it may be replaced by any objects capable of performing the above-described functions.

The base station control node 240 connects the existing network base station 220 and the control plane gateway 250 on the control plane to exchange control messages with each other. In this system architecture 200 according to at least one embodiment of the present disclosure where the base station control node 240 connects the existing network base station 220 and the control plane gateway 250 on the control plane, the control message is transmitted to and received from only the existing network base station 220, and the control message is not transmitted to the next-generation network base station 230.

The control plane gateway 250 is a component that supports terminal mobility on the control plane and performs signaling and control functions. The control plane gateway 250 performs functions such as policy control, mobility management, or bearer management. Specifically, the control plane gateway 250 makes a decision on whether to provide the next-generation network to the terminal 210, the maximum data transfer rate of the network to be determined, and the like.

The control plane gateway 250 connects the base station control node 240 and the user plane gateway 260 on the control plane to exchange control messages with each other.

The user plane gateway 260 transmits and receives data on the user plane. The user plane gateway 260 performs functions such as packet forwarding, proceeding tunnel encapsulation and decapsulation or Quality of Service (QoS) guarantee of user packets.

In the system architecture 200 according to the embodiment of the present disclosure shown in FIG. 2, the dotted lines show the user plane interface, the solid lines the control plane interface, the dash-dot-dotted lines the network connection between the terminal and the base station.

The terminal 210 is connected to the existing network base station 220 or the next-generation network base station 230, and it receives network service provided by one or both of the two base stations.

In the system architecture 200 according to some embodiments of the present disclosure, only the existing network base station 220 is connected to the control plane gateway 250 using the control plane interface via the base station control node 240. The control plane gateway 250 transmits its decisions to the user plane gateway 260.

In the system architecture 200 according to some embodiments of the present disclosure, the existing network base station 220 or the next-generation network base station 230 is linked with the user plane gateway 260 by using the user plane interface. When the CN splitting method is employed for interworking between the existing network and the next-generation network, the user plane gateway 260 is linked to the existing network base station 220 and the next-generation network base station 230 respectively by using the user plane interface. On the other hand, when the PDCP splitting method is employed for interworking between the existing network and the next-generation network, the user plane gateway 260 is linked via the user plane interface with only the existing network base station 220 which is linked with the next-generation network base station 230 via the user plane interface.

Although the system architecture 200 in FIG. 2 is shown assuming use of a gateway in which the user plane and the control plane are separated, it is not limited thereto. The system architecture 200 according to some embodiments of the present disclosure utilizes a Serving Gateway (S-GW) and a Packet data network Gateway (P-GW) in which the user plane and the control plane are not separated from each other.

In addition, for example, the existing network is LTE, and the next-generation network may be a 5G mobile communication system, but it is not necessarily limited thereto. The existing network may refer to any networks complete with a system architecture for providing the mobile communication service, and the next-generation network may refer to a network with no complete system structure for providing mobile communication service, including 5G mobile communication system.

FIG. 3 is a flowchart of a process of providing a network to a terminal by a system architecture according to at least one embodiment of the present disclosure.

The terminal 210 transmits a network connection establishment message to the existing network base station 220, and this message is transmitted to the base station control node 240 (S310). When first attempting to establish a connection to the network or when a connection is required to another network separately from the network to which the terminal is already connected, the terminal 210 transmits the network connection establishment message to the base station control node 240. At this time, the terminal 210 may transmit the network connection establishment message with information included on the use of the next-generation network. The information on utilization of the next-generation network includes capability information indicating whether the terminal 210 is capable of supporting the next-generation network, or access point name (APN) information indicating that the terminal 210 desires to use the next-generation network, or the like.

Upon receiving the network connection establishment message, the base station control node 240 makes a decision on whether or not to permit use of the next-generation network and on the maximum data transfer rate for each network, and it selects a gateway node capable of supporting the decisions made (S320). In deciding whether or not to approve utilization of the next-generation network, the base station control node 240 utilizes information on the terminal previously stored in a subscriber information database or home subscriber server (HSS) or information on whether to activate the next-generation network to access the terminal, in addition to the information on utilization of the next-generation network included in the network connection establishment message. The information on the terminal includes information on whether or not the terminal 210 has been registered in a service that can use the next-generation network, information on whether or not the terminal 120 has exceeded the usage limit for the next-generation network, among others. The information on whether to activate the next-generation network to access the terminal includes information on whether to permit user plane connectivity using the next-generation network and the like. Upon receiving the information on the terminal previously stored in the subscriber information database or the information on whether to activate the next-generation network to access the terminal, the base station control node 240 saves the same in the form of access restriction Information. The base station control node 240 can decide whether or not to allow the terminal 210 to use the next-generation network by also receiving the terminal location information from the terminal 210 together with the aforementioned information. Based on the location information of the terminal, the base station control node 240 additionally determines whether the terminal belongs to the service area of the next-generation network, so that the base station control node 240 can decide whether or not to allow the terminal 210 to use the next-generation network. The base station control node 240 can permit the terminal 210 to use the next-generation network, when the terminal 210 satisfies one or more combinations of the above conditions, that is, when the terminal 210 supports the next-generation network, the terminal 210 requests utilization of the next-generation network, the terminal 210 is subscribing to a service that can use the next-generation network, the terminal 210 has not exceeded the usage limit for the next-generation network, and the terminal 210 belongs to a service area of the next-generation network. The base station control node 240 decides whether to approve or disapprove utilization of the next-generation network, and it can determine the maximum data transfer rate for each network at the same time. The base station control node 240 can determine the maximum data transfer rate for each network, regardless of whether or not the terminal is permitted to use the next-generation network. Here, the maximum data transfer rate may be in the form of aggregated maximum bit rate (AMBR), or APN-AMBR applied to a specific access point name (APN).

The base station control node 240 selects a gateway node that can support the network depending on whether or not to permit to use the next-generation network by the terminal. When permitting the use of the next-generation network by the terminal, the base station control node 240 selects the gateway node to provide the next-generation network. In selecting a gateway node to provide a next-generation network, the base station control node 240 can make the selection by additionally taking account of whether the gateway node is capable or incapable of supporting the maximum data transfer rate for the next-generation network or whether the gateway node is one where the user plane and the control plane are separated. The base station control node 240 may support the maximum data transfer rate and preferentially select the gateway node where the user plane and the control plane are separated. Conversely, when disallowing the use of the next-generation network by the terminal, the base station control node 240 selects a gateway node to provide the existing network. In selecting a gateway node to provide an existing network, the base station control node 240 may preferentially select a gateway node capable of supporting the maximum data transfer rate for the existing network.

The base station control node 240 transmits a network connection establishment request to the gateway node selected through the process described above (S330). The base station control node 240 may transmit the network connection establishment request by incorporating information on the utilization of the next-generation network, the maximum data transfer rate for the next-generation network or the maximum data transfer rate for the existing network. In particular, when the terminal is permitted to use the next-generation network, the network connection establishment request transmitted by the base station control node 240 to the gateway node, may include both of the maximum data transfer rate for the existing network and the maximum data transfer rate for the next-generation network.

The control plane gateway 250 determines the maximum data transfer rate for the next-generation network and the maximum data transfer rate for the existing network, respectively, which will be applied to the connection between the terminal and the user plane gateway (S340). The control plane gateway 250 receives from the base station control node 240, information on utilization of the next-generation network, information on the maximum data transfer rate for the existing network, and the maximum data transfer rate for the next-generation network. In addition, the control plane gateway 250 receives information on the policy and charging on the terminal 210 from nodes of other base stations, for example, a policy and charging management system or the like. In determining the maximum data transfer rate for each network, the control plane gateway 250 may just accept the maximum data transfer rate for each network as determined by the base station control node 240. On the other hand, the control plane gateway 250 may change the maximum data transfer rate for each network determined by the base station control node 240 based on information on the policy and charging on terminals received from nodes of other base stations.

Upon determining the maximum data transfer rates for the next-generation network and the existing network, the control plane gateway 250 transmits a message requesting the installation of a flow table to the user plane gateway node 260 (S350). The control plane gateway 250 sends the flow table installation message to the user plane gateway node 260 so that traffic is exchanged between the base stations 220, 230 and the user plane gateway node 260. At this time, the flow table installation message may include the maximum data transfer rate for each network. The flow table refers to a table that defines a processing operation for each flow, and it may store a flow identifier (e.g., a combination of the header fields of packets) for identifying a flow, statistical information, operating information, etc.

When installing the flow table, the user plane gateway 260 sends the control plane gateway 250 a message to approve the installation of the flow table (S360).

When the installation of the flow table is completed, the control plane gateway 250 transmits the maximum data transfer rate for each network to be applied to the connection between the terminal 210 and the user plane gateway 260, to the base station control node 240 (S370). The control plane gateway 250 transmits the determined maximum data transfer rate for each network to the base station control node 240.

The base station control node 240 transmits a connection acceptance message to the terminal 210 via the existing network base station 220 (S380). In transmitting the connection acceptance message to the terminal 210, the base station control node 240 incorporates therein the maximum data transfer rate for each network received from the control plane gateway 250. Upon receiving the maximum data transfer rate for each network, the terminal 210 may transmit the uplink traffic by using an appropriate network according to the state of the terminal or the state of the network, that is, by using an existing network or a next-generation network as appropriate.

Figure 4A:
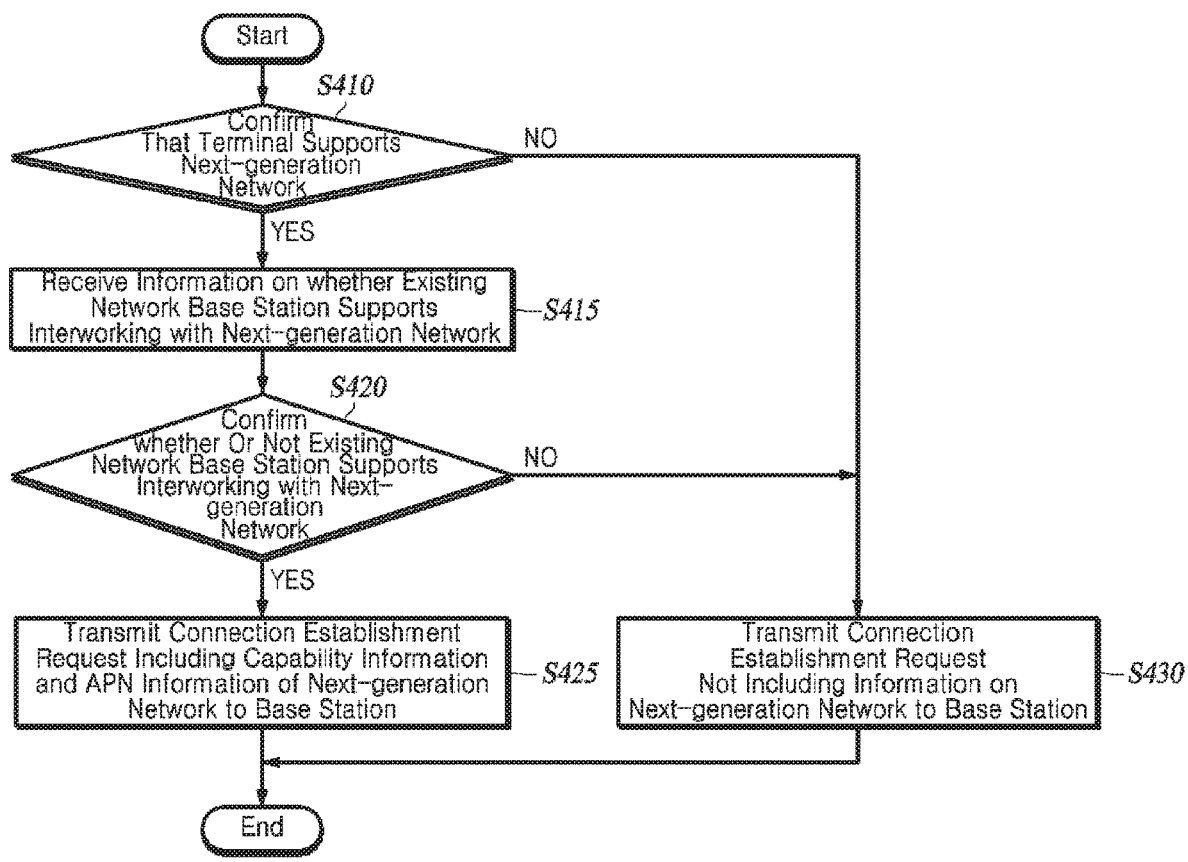
FIG. 4A is a flowchart of a method that a terminal determines whether or not a base station supports interworking between an existing network and a next-generation network, according to at least one embodiment of the present disclosure.

FIG. 4A is a flowchart of a method that a terminal determines whether or not a base station supports interworking between an existing network and a next-generation network, according to at least one embodiment of the present disclosure.

At the initial connection with the network, the terminal 210 confirms that it supports the next-generation network (S410).

The terminal receives from the base station of the existing network, information on whether the existing network base station supports interworking with the next-generation network (S415). The terminal 210 receives basic system information for connection from the existing network base station 220, and additional system information for an operator to determine whether the existing network base station 220 supports interworking with the next-generation network.

The terminal confirms whether the existing network base station supports interworking with the next-generation network (S420). From the additional system information received together with the basic system information, the terminal 210 determines whether the base station 220 supports interworking with the next-generation network.

When the base station supports interworking with the next-generation network, the terminal transmits a connection establishment message to the base station (S425). Where the existing network base station 220 supports interworking with the next-generation network, the terminal 210 transmits a connection establishment message to the existing network base station 220. As described with reference to FIG. 3, information on utilization of the next-generation network may be included in the connection establishment message. The information on utilization of the next-generation network includes capability information indicating whether the terminal 210 is capable of supporting the next-generation network, information on the terminal 210 requesting utilization of the next-generation network, or the like.

When the terminal does not support the next-generation network or the base station does not support interworking with the next-generation network, the terminal transmits a connection establishment message not including information on utilization of the next-generation network, to the base station (S430). Since the terminal 210 cannot use the next-generation network, it transmits the connection establishment message not including information on utilization of the next-generation network to the existing network base station 220.

Figure 4B:
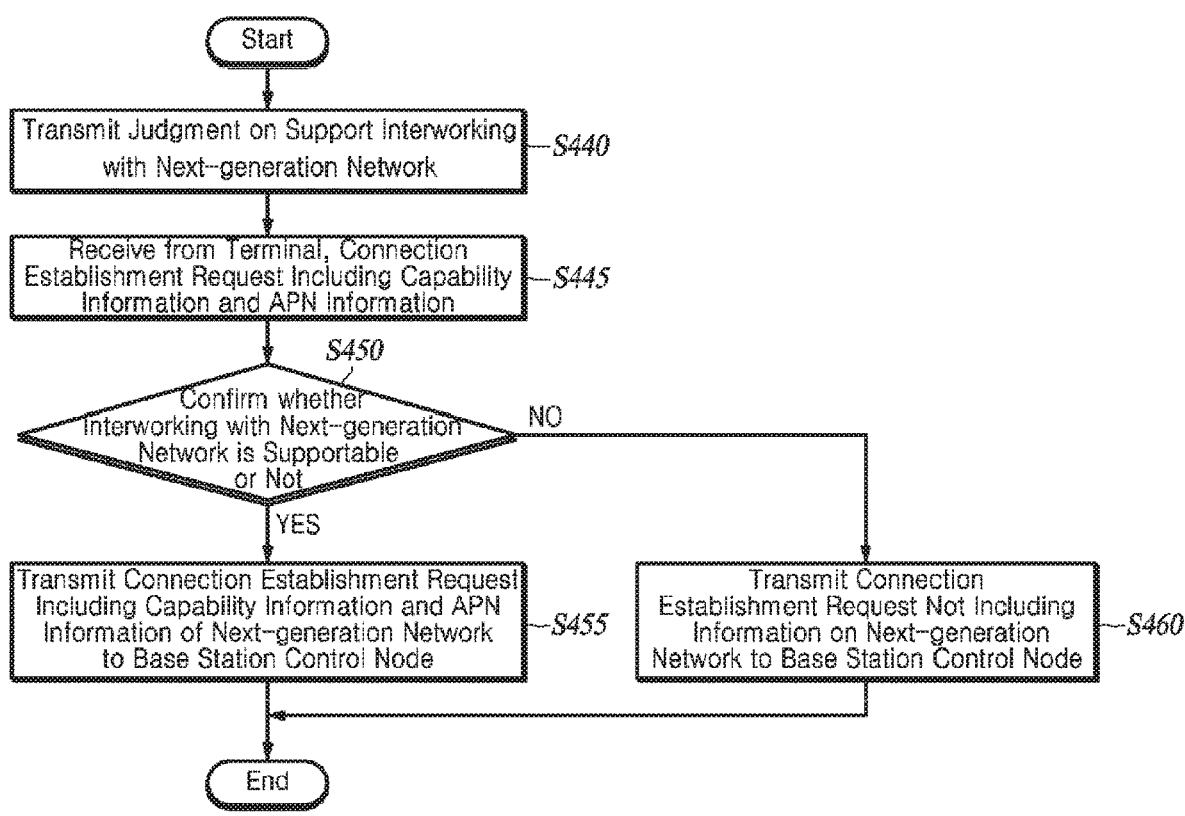
FIG. 4B is a flowchart of a method of determining whether or not a base station supports interworking between an existing network and a next-generation network, according to at least one embodiment of the present disclosure.

FIG. 4B is a flowchart of a method of determining whether or not a base station supports interworking between an existing network and a next-generation network, according to at least one embodiment of the present disclosure.

The base station determines whether or not it supports interworking with the next-generation network and transmits the judgment on the support as system information (S440). In determining whether or not the existing network base station 220 supports interworking with the next-generation network, the existing network base station 220 takes account of whether an interface setting has been established with regard to interworking with the next-generation network base station 230 or whether that setting has been established on an initial connection between the core network 270 and the existing network base station 220, or the like. The existing network base station 220 determines whether it supports interworking with the next-generation network and transmits the decision as system information to the terminal 210.

The base station receives a connection establishment message including information on utilization of the next-generation network from the terminal (S445). The information on utilization of the next-generation network includes information on capability information indicating whether the terminal 210 can support the next-generation network, or information on whether the terminal 210 requests utilization of the next-generation network Information, or the like. The existing network base station 220 receives a connection establishment message including information on utilization of the next-generation network from the terminal 210.

The base station confirms whether or not it supports interworking with the next-generation network (S450). Upon receiving the connection establishment message from the terminal 210, the existing network base station 220 reconfirms whether it supports interworking with the next-generation network.

In case of supporting interworking with the next-generation network, the base station transmits a connection establishment message including information on utilization of the next-generation network to the base station control node (S455).

When not supporting the interworking with the next-generation network, the base station transmits a connection establishment message not including the information on utilization of the next-generation network, to the base station control node (S460).

As described with reference to FIGS. 4A and 4B, by determining in advance whether a terminal or a base station according to some embodiments of the present disclosure supports interworking with an existing network and a next-generation network, the base station can ascertain whether interworking is supported between the base station, the terminal and the respective networks without requiring the terminal to separately perform advance scanning of next-generation network radio waves. This reduces consumption of the battery of the terminal due to scanning of next-generation network radio waves.

Figure 5A:
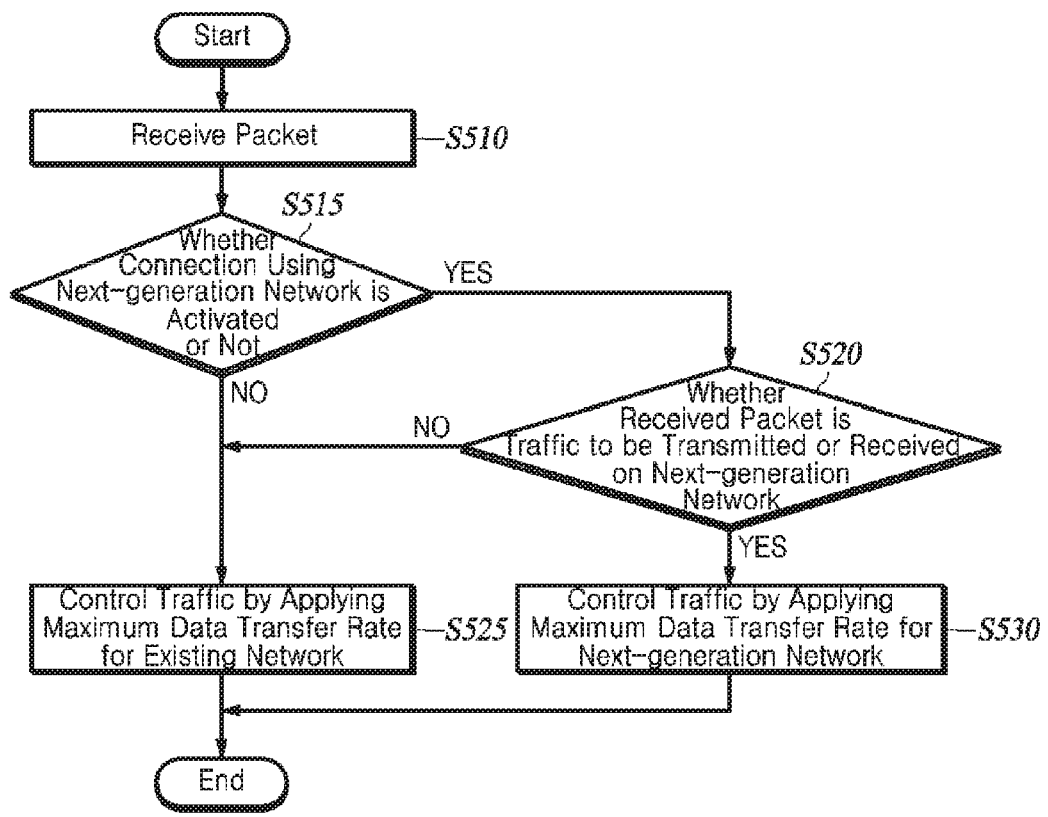
FIG. 5A is a flowchart of a method of controlling a transfer rate by a terminal or a gateway according to a state of the terminal or a network, according to at least one embodiment of the present disclosure.

FIG. 5A is a flowchart of a method of controlling a transfer rate by a terminal or a gateway according to a state of the terminal or a network, according to at least one embodiment of the present disclosure. Particularly, FIG. 5A shows a method of controlling a transfer rate by a terminal or a gateway according to a state of the terminal or a network, when the CN splitting method is applied to a base station.

A terminal or a gateway receives a packet (S510). The terminal 210 or the user plane gateway 260 receives a packet.

The terminal or the gateway determines whether the connection using the next-generation network between the terminal and the user plane gateway is activated (S515). The connection utilizing the next-generation network between the terminal and the user plane gateway 260 depends on whether or not the terminal 210 can support the next-generation network or it requests the support, whether or not the terminal 210 is subscribing to the next-generation network service or it has exceeded the usage limit for the next-generation network, and whether the terminal 210 is outside of the service area of the next-generation network, among others. Therefore, the terminal 210 or the user plane gateway 260 determines whether the connection using the next-generation network is activated between the terminal 210 and the user plane gateway 260.

The terminal or the gateway confirms whether the received packet is the traffic to be transmitted or received on the next-generation network (S520). Since the CN splitting method is applied to the interworking between the respective networks, the terminal 210 or the user plane gateway 260 cannot identify the received packet immediately whether it is the traffic to be transmitted or received on the next-generation network or on the existing network. Therefore, the terminal 210 or the user plane gateway 260 confirms whether the received packet is the traffic to be transmitted or received on the next-generation network. This can be implemented by confirming whether the bearer or flow to which the packet belongs has been allocated to the next-generation network or whether the next-generation network is set higher in transfer priority order of the bearer or flow to which the packet belongs than that of the existing network.

When a connection using the next-generation network is inactivated between the terminal and the user plane gateway, or when the received packet is a traffic that is received and transmitted on the existing network, the terminal or the gateway controls the traffic by applying the maximum data transfer rate for the existing network (S525). In the above case, the terminal 210 or the user plane gateway 260 determines that it cannot transmit the traffic using the next-generation network. Accordingly, the terminal 210 or the user plane gateway 260 controls to transmit the traffic by applying the maximum data transfer rate for the existing network.

When the connection using the next-generation network is activated between the terminal and the user plane gateway, and the received packet is traffic that is transmitted and received on the next-generation network, the terminal or the gateway controls the traffic by applying by applying the maximum data transfer rate for the existing network (S530). In the above case, the terminal 210 or the user plane gateway 260 determines that it can transmit the traffic by using the next-generation network. Therefore, the terminal 210 or the user plane gateway 260 controls transmission of the traffic by applying the maximum data transfer rate for the next-generation network.

The present embodiment assumes that the function of the gateway is divided by the user plane and the control plane, but the substance of this embodiment is also applicable to where the function of the gateway is not divided. Then, the gateway serves as a user plane gateway.

Figure 5B:
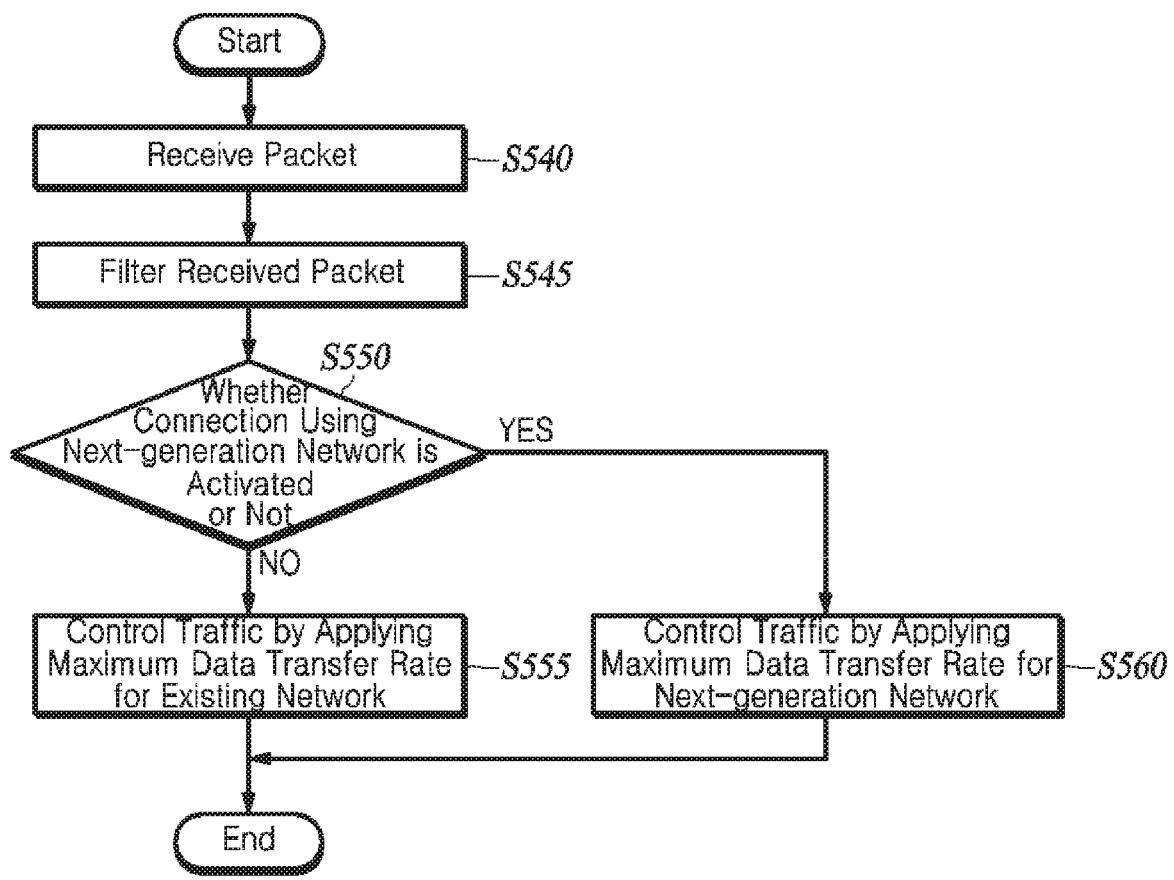
FIG. 5B is a flowchart of a method of controlling a transfer rate by a terminal or a gateway according to a state of the terminal or a network, according to another embodiment of the present disclosure.

FIG. 5B is a flowchart of a method of controlling a transfer rate by a terminal or a gateway according to a state of the terminal or a network, according to another embodiment of the present disclosure. Particularly, FIG. 5B shows a method of controlling a transfer rate by a terminal or a gateway according to a state of the terminal or a network, when the PDCP splitting method is applied to a base station.

The terminal or the gateway receives a packet (S540). The terminal 210 or the user plane gateway 260 receives the packet.

The terminal or the gateway filters the received packet (S545). The terminal 210 or the user plane gateway 260 filters the received packet to distinguish whether the packet is a packet belonging to the MCG bearer or a split bearer.

The terminal or the gateway determines whether the connection using the next-generation network is activated between the terminal and the user plane gateway (S550). The connection using the next-generation network between the terminal 210 and the user plane gateway 260 depends on whether or not the terminal 210 can support the next-generation network or it requests the support, whether or not the terminal 210 is subscribing to the next-generation network service or it has exceeded the usage limit for the next-generation network, and whether the terminal 210 is outside of the service area of the next-generation network, among others. Therefore, the terminal 210 or the user plane gateway 260 determines whether the connection using the next-generation network is activated.

When the connection using the next-generation network is inactivated between the terminal and the user plane gateway, traffic is controlled by applying the maximum data transfer rate for the existing network (S555). Since the traffic cannot be transmitted by using the next-generation network, the terminal 210 or the user plane gateway 260 controls to transmit the traffic by applying the maximum data transfer rate for the existing network.

When the connection using the next-generation network is activated between the terminal and the user plane gateway, traffic is controlled by applying the maximum data transfer rate for the existing network (S560). Since the traffic can be transmitted by using the next-generation network, the terminal 210 or the user plane gateway 260 controls so as to transmit the traffic by applying the maximum data transfer rate for the next-generation network.

A method of controlling a transfer rate according to a state of a terminal or a network according to some embodiments of the present disclosure is applicable to an uplink traffic transmission control when it is applied to a terminal 210. When applied to the gateway 260, the method in some embodiments is applicable to a downlink traffic transmission control.

The present embodiment assumes that the function of the gateway is divided by the user plane and the control plane, but the substance of this embodiment is also applicable to where the function of the gateway is not divided. Then, the gateway serves as a user plane gateway.

FIG. 6 is a flowchart of a process that a system architecture according to at least one embodiment of the present disclosure determines whether or not the next-generation network is activated. Information on the determined activation or inactivation is used for selecting the transmission path between the next-generation network and the existing network, or determining the maximum data transfer rate to apply at the time of transmission. The process illustrated in FIG. 6, which has gone through the process illustrated in FIG. 3, begins with a state in which the terminal and the user plane gateway are interconnected with the respective networks interworking therebetween.

The terminal, the existing network base station, or the next-generation network base station determines whether or not the packet can be transferred to the next-generation network by using the next-generation network base station (S610). The terminal 210, the existing network base station 220, or the next-generation network base station 230 uses the next-generation network base station 230 to determine whether the next-generation network is available for transmitting the packet, i.e., whether the next-generation network is activated.

The existing network base station transmits to the base station control node, information on whether or not the next-generation network is activated (S620). When the existing network base station 220 has determined whether the next-generation network is active or not, it transmits the determined result to the base station control node 240. In case where the terminal 210 or the next-generation network base station 230 has determined whether the next-generation network is active or not, the existing network base station 220 receives information on whether the next-generation network is active or not from the terminal 210 or the next-generation network base station 230, and transmits the information to the base station control node 240.

The base station control node transmits to the control node gateway, the information on whether or not the next-generation network is activated (S630). With the base station control node 240 informing the control node gateway 250 of whether the next-generation network is active or not, the control node gateway 250 uses the received information for controlling the traffic.

According to the system architecture according to at least one embodiment of the present disclosure shown in FIG. 6, the existing network base station operates on the control plane, to transmit the information on whether the next-generation network is active or not, to the base station control node.

Figure 7:
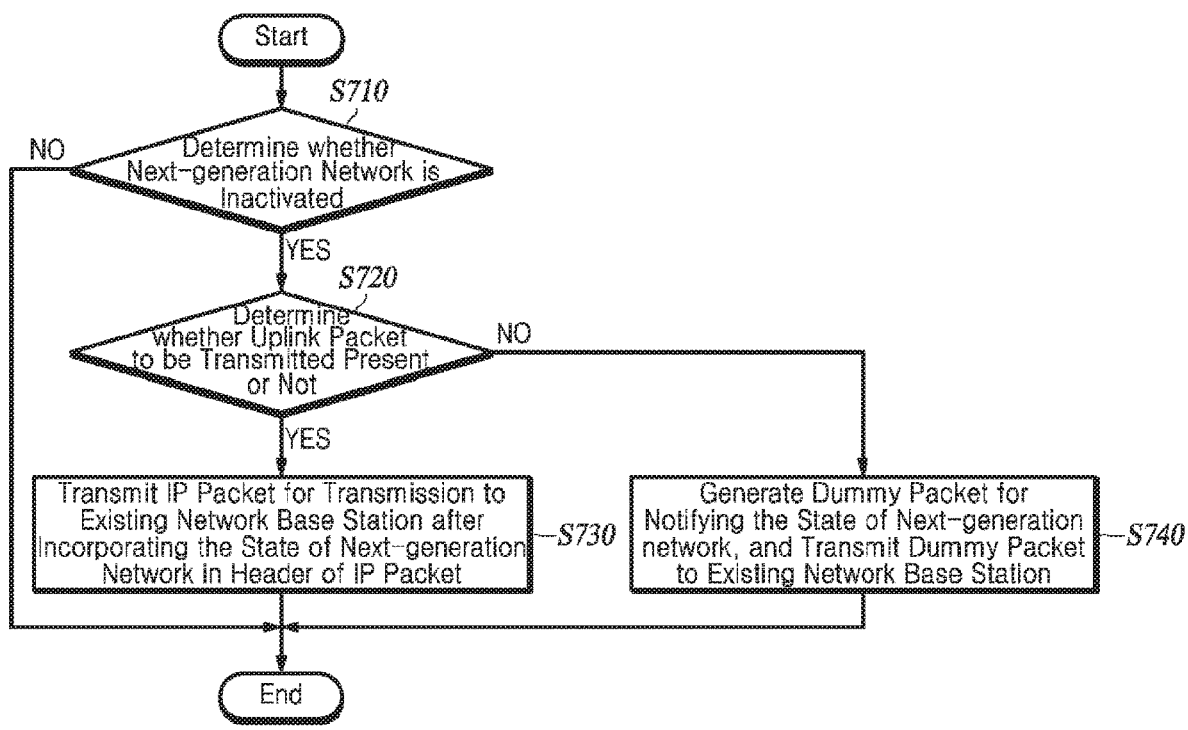
FIG. 7 is a flowchart of a method that a terminal determines and notifies whether or not the next-generation network is activated, according to at least one embodiment of the present disclosure.

FIG. 7 is a flowchart of a method that a terminal determines and notifies whether or not the next-generation network is activated, according to at least one embodiment of the present disclosure. The method illustrated in FIG. 7, which has gone through the process illustrated in FIG. 3, begins with a state in which the terminal and the user plane gateway are interconnected with the respective networks interworking therebetween.

The terminal 210 determines whether the next-generation network is inactivated (S710). The terminal 210 regularly detects the connection state of the next-generation network and determines whether the next-generation network is inactivated. The terminal 210 can detect the connection state of the next-generation network by measuring the strength of the signal transmitted to and received from the next-generation network base station 230. By determining whether there is at least a predetermined drop of strength of the signal exchanged between the terminal 210 and the next-generation network base station 230 for a predetermined time or longer, the terminal 210 can detect the connection state of the next-generation network. Alternatively, the terminal can detect the connection state of the next-generation network by determining no packet exchange occurring between the terminal 210 and the next-generation network base station 230 for a certain period of time or longer, or by determining when there is at least a certain number of failed packet transmissions/receptions.

When the next-generation network becomes inactive, the presence or absence of an uplink packet to be transmitted is determined (S720). When the next-generation network is inactivated, the terminal 210 determines whether there is a transmission uplink packet.

When there is an uplink packet for transmission, the IP packet incorporating the state of the next-generation network in the IP packet header for transmission, is transmitted to the existing network base station (S730). In the presence of an uplink packet for transmission, the terminal 210 transmits an internet protocol (IP) packet incorporating information on the inactivation of the next-generation network in the header, to the existing network base station 220. More specifically, the terminal 210 may transmit the IP packet with the state of the next-generation network being marked at the DSCP/ECN field (in case of IPv4) or Traffic Class/Flow Label field (in case of IPv6) in the IP header.

When there is no uplink packet for transmission, a dummy IP packet for notifying the state of the next-generation network is generated and transmitted to the existing network base station (S740). The terminal 210 needs to issue a notification of the state of the next-generation network, when no current uplink packet is present for transmission. This conflict can be resolved by the terminal 210 generating a dummy IP packet for notifying the state of the next-generation network. The dummy IP packet includes information indicating that it is not such data on the actual user plane, and it is discarded after the base station control node or the gateway detects the state of the next-generation network.

The method according to at least one embodiment of the disclosure shown in FIG. 7 allows the existing network base station to transmit, to the base station control node on the user plane, information on whether the next-generation network is active or not. Using no messages on the control plane can avoid signal overhead on the network system.

Figure 8:
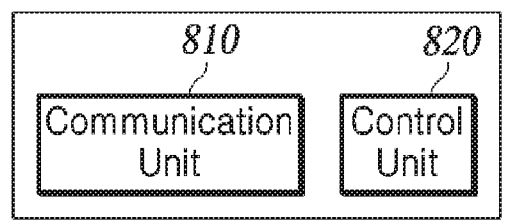
FIG. 8 is a block diagram of a terminal according to at least one embodiment of the present disclosure.

FIG. 8 is a block diagram of a terminal according to at least one embodiment of the present disclosure.

Referring to FIG. 8, a terminal 210 according to some embodiments of the present disclosure includes a communication unit 810 and a control unit 820.

The communication unit 810 transmits a connection establishment message to the base station control node 240 via the existing network base station 220, and receives a connection acceptance message from the base station control node 240. The communication unit 810 receives the connection acceptance message, and receives the maximum data transfer rate for the next-generation network and the maximum data transfer rate for the existing network, too.

The communication unit 810 receives a packet. The communication unit 810 receives an uplink packet transmitted from the outside.

The control unit 820 determines whether the received packet is traffic using the next-generation network and whether the mobile communication system using the next-generation network is activated. Based on the determination result, the control unit 820 connects to the user plane gateway 260 by applying the maximum data transfer rate for the next-generation network or the maximum data transfer rate for the existing network. In the case where the received packet is traffic using the next-generation network and the mobile communication system using the next-generation network is activated, the control unit 820 controls the transmission of traffic by using the next-generation network to which the maximum data transfer rate is applied. On the contrary, where the received packet is not traffic using the next-generation network, or the mobile communication system using the next-generation network is inactivated, the control unit 820 uses the existing network to which the maximum data transfer rate is applied, to control the transmission of traffic.

Figure 9:
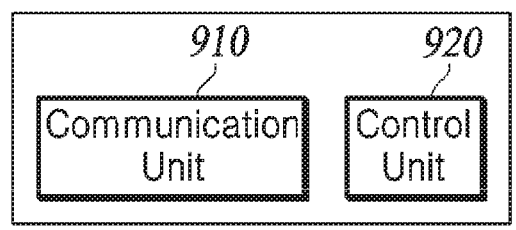
FIG. 9 is a block diagram of a base station according to at least one embodiment of the present disclosure.

FIG. 9 is a block diagram of a base station according to at least one embodiment of the present disclosure.

Referring to FIG. 9, a base station 220 of an existing network according to some embodiments of the present disclosure includes a communication unit 910 and a control unit 920.

The communication unit 910 transmits the system information to the terminal 210. The system information includes information on whether or not the existing network base station 220 supports an interworking service with the next-generation network. The communication unit 910 transmits to the terminal 210, the system information including information on whether or not it supports the interworking service with the next-generation network, and it receives from the terminal 210, a connection establishment message including information on utilization of the next-generation network.

The communication unit 910 relays the connection establishment message from the terminal 210 to the base station control node 230. At this time, the connection establishment message may include information on utilization of the next-generation network.

The communication unit 910 receives a connection acceptance message from the base station control node 240. The communication unit 810 receives the connection acceptance message, and receives the maximum data transfer rate for the next-generation network and the maximum data transfer rate of the existing network, too.

The control unit 920 determines whether or not it supports interworking with the next-generation network. The existing network base station 220 determines whether or not it supports interworking with the next-generation network based on information on whether the setting of the interface has been made relating to interworking with the next-generation network base station 230, or information on whether the setting of interworking with the next-generation network has been made on the initial connection between the core network 270 and the existing network base station 220.

Upon receiving a connection establishment message from the terminal 210, the control unit 920 determines whether or not the existing network base station 220 supports interworking with the next-generation network. In case where the existing network base station 220 supports interworking with the next-generation network, the control unit 920 controls to include information on utilization of the next-generation network received from the terminal, in the connection establishment message. On the other hand, when the existing network base station 220 does not support interworking with the next-generation network, the control unit 920 controls not to include information on utilization of the next-generation network received from the terminal, in the connection establishment message.

The control unit 920 decides, based on the resultant determination made previously, whether or not to transmit the connection acceptance message with the information on utilization of the next-generation network included. When not supporting interworking with the next-generation network, the control unit 920 controls not to include information on utilization of the next-generation network in the connection establishment message. Conversely, when supporting the interworking with the next-generation network, the control unit 920 controls to include information on utilization of the next-generation network in the connection establishment message.

Figure 10:
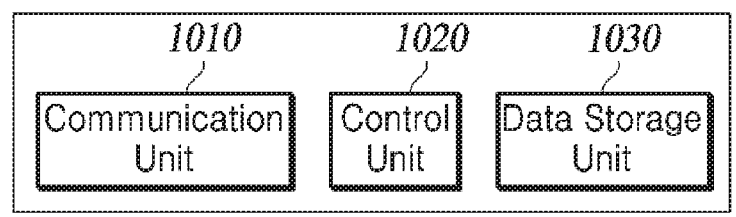
FIG. 10 is a block diagram of a base station control node according to at least one embodiment of the present disclosure.

FIG. 10 is a block diagram of a base station control node according to at least one embodiment of the present disclosure.

Referring to FIG. 10, a base station control node 240 according to some embodiments of the present disclosure includes a communication unit 1010, a control unit 1020 and a data storage unit 1030.

The communication unit 1010 receives from the terminal, a network connection establishment message including information on utilization of the next-generation network, and transmits a network connection establishment request message to the selected gateway.

The control unit 1020 decides whether or not to permit the terminal 210 to utilize the next-generation network by using the information on utilization of the next-generation network and the information on the terminal 210. The control unit 1020 decides whether or not to permit the terminal 210 to utilize the next-generation network by taking account of whether the terminal 210 supports the next-generation network, whether or not it has requested utilization of the next-generation network, whether it subscribes to a service for utilization of the next-generation network, or whether or not it exceeds the usage limit of the next-generation network, among others.

The data storage unit 1030 stores information on the terminal. The information on the terminal includes information on whether or not the terminal 210 is subscribing to a service for allowing the use of the next-generation network, and information on whether or not the terminal has exceeded the usage limit of the next-generation network.

Figure 11:
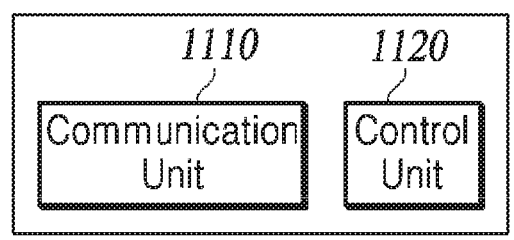
FIG. 11 is a block diagram of a gateway according to at least one embodiment of the present disclosure.

FIG. 11 is a block diagram of a gateway according to at least one embodiment of the present disclosure.

Referring to FIG. 11, a control plane gateway 250 according to some embodiments of the present disclosure includes a communication unit 1110 and a control unit 1120.

The communication unit 1110 receives from the base station control node 240, a network connection establishment request message including information on utilization of the next-generation network by the terminal 210, and from the outside, information on the policy and charging on terminals.

The communication unit 1110 transmits a flow table installation message to the user plane gateway 260 so that traffic is transferred between the terminal 210 and the user plane gateway 260.

The communication unit 1110 transmits to the base station control node 240, a connection acceptance message including the maximum data transfer rate for the next-generation network and the maximum data transfer rate for the existing network.

Referring to the information on utilization of the next-generation network by the terminal and the above information on the policy and charging, the control unit 1120 determines the maximum data transfer rate for the next-generation network and the maximum data transfer rate for the existing network to be provided to the terminal 210, respectively.

Figure 12A:
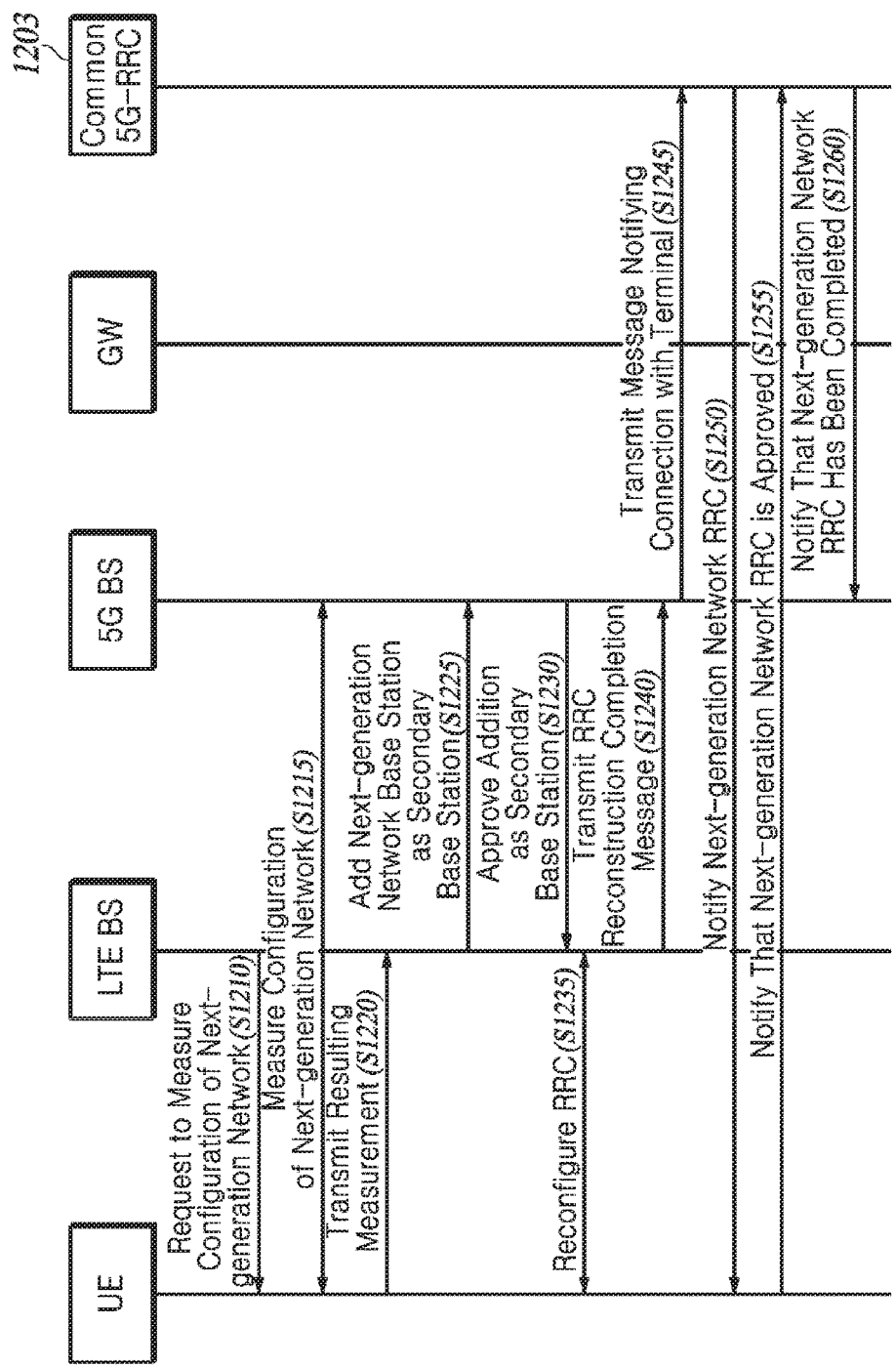
FIGS. 12A, 12B, and 12C are flowcharts of processes performed by system architectures according to some embodiments of the present disclosure for transmission of information for utilizing a next-generation network over an existing network.

FIG. 12A is a flowchart of a process performed by a system architecture according to at least one embodiment of the present disclosure for transmission of information for utilizing a next-generation network over an existing network.

The existing network base station 220 requests the terminal 210 to measure the configuration of the next-generation network (S1210). Specifically, the configuration of the next-generation network includes the frequency of the next-generation network being used, or the Physical Cell ID (PCID) of the next-generation network base station.

The terminal 210 measures the configuration of the next-generation network by way of interworking with the next-generation network base station 230 (S1215). Through interworking with the next-generation network base station 230, the terminal 210 measures the frequency of the next-generation network, the strength of the signal transmitted/received, the PCID of the next-generation network base station, etc.

The terminal 210 transmits the resulting measurement to the existing network base station 220 (51220).

The existing network base station 220 adds the measured next-generation network base station 230 as a secondary base station (S1225).

The next-generation network base station 230 approves the addition as the secondary base station and transmits a message of approval to the existing network base station 220 (S1230).

When the next-generation network base station 230 is added as the secondary base station, the Radio Resource Control (RRC) between the terminal 210 and the existing network base station 220 is reconfigured (S1235).

The existing network base station 220 transmits to the next-generation network base station 230 a message notifying that the reconstruction of the RRC has been completed (S1240).

The next-generation network base station 230 transfers a message notifying that it has been linked with the terminal 210 to an RRC management node 1203 (S1245). The message notifying the linkage with the terminal 210 includes the PCID of the next-generation network base station, the identifier of the terminal (User Entity ID or UEID), the reconfigured RRC, and the like.

The RRC management node 1203 notifies the terminal 210 of the RRC of the next-generation network (S1250). The RRC information of the next-generation network includes the PCID of the next-generation network base station or the reconstructed RRC, etc.

The terminal 210 notifies the RRC management node 1203 of the approval of the RRC of the next-generation network (S1255).

The RRC management node 1203 notifies the next-generation network base station 230 that the RRC of the next-generation network has been completed (S1260).

Figure 12B:
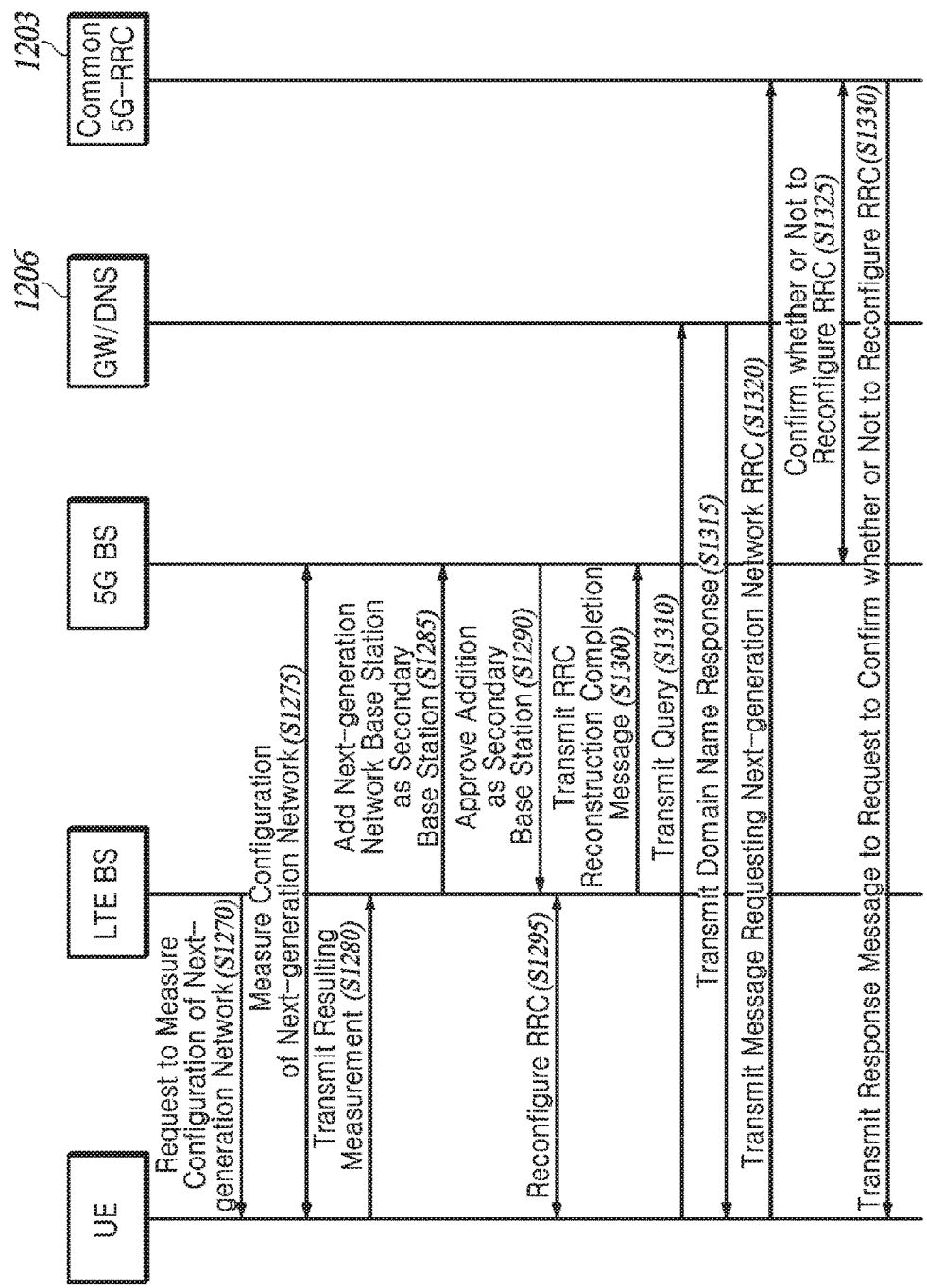

FIG. 12B is a flowchart of a process performed by a system architecture according to another embodiment of the present disclosure for transmission of information for utilizing a next-generation network over an existing network. Steps S1270 to S1300 of FIG. 12B are the same as Steps S1210 to S1240 of FIG. 12A, and the description thereof will be omitted.

The terminal 210 transmits a query to a gateway/domain name system (DNS) 1206 (S1310). The query includes the domain name of the next-generation network base station 230 or the PCID of the next-generation network base station 230.

The gateway/domain name system 1206 transmits a domain name response to the terminal 210 (S1315). The domain name response contains the IP address.

The terminal 210 transmits a message requesting the next-generation network RRC to the RRC management node 1203 (S1320). The message requesting the next-generation network RRC includes the PCID of the next-generation network base station 230 or the identifier of the terminal (UEID).

The RRC management node 1203 confirms whether or not to reconfigure the RRC at the next-generation network base station 230 (S1325). Through internal communications with the next-generation network base station 230, the RRC management node 1203 confirms whether or not the RRC reconfiguration has been performed, whether or not the PCID of the next-generation network base station 230 matches, or whether or not the terminal identifier (UEID) matches, etc.

The RRC management node 1203 transmits a response message to the request of the next-generation network RRC, to the terminal 210 (S1330). The RRC management node 1203 transmits a response message to the request of the next-generation network RRC based on the result of confirmation with the next-generation network base station 230.

Figure 12C:
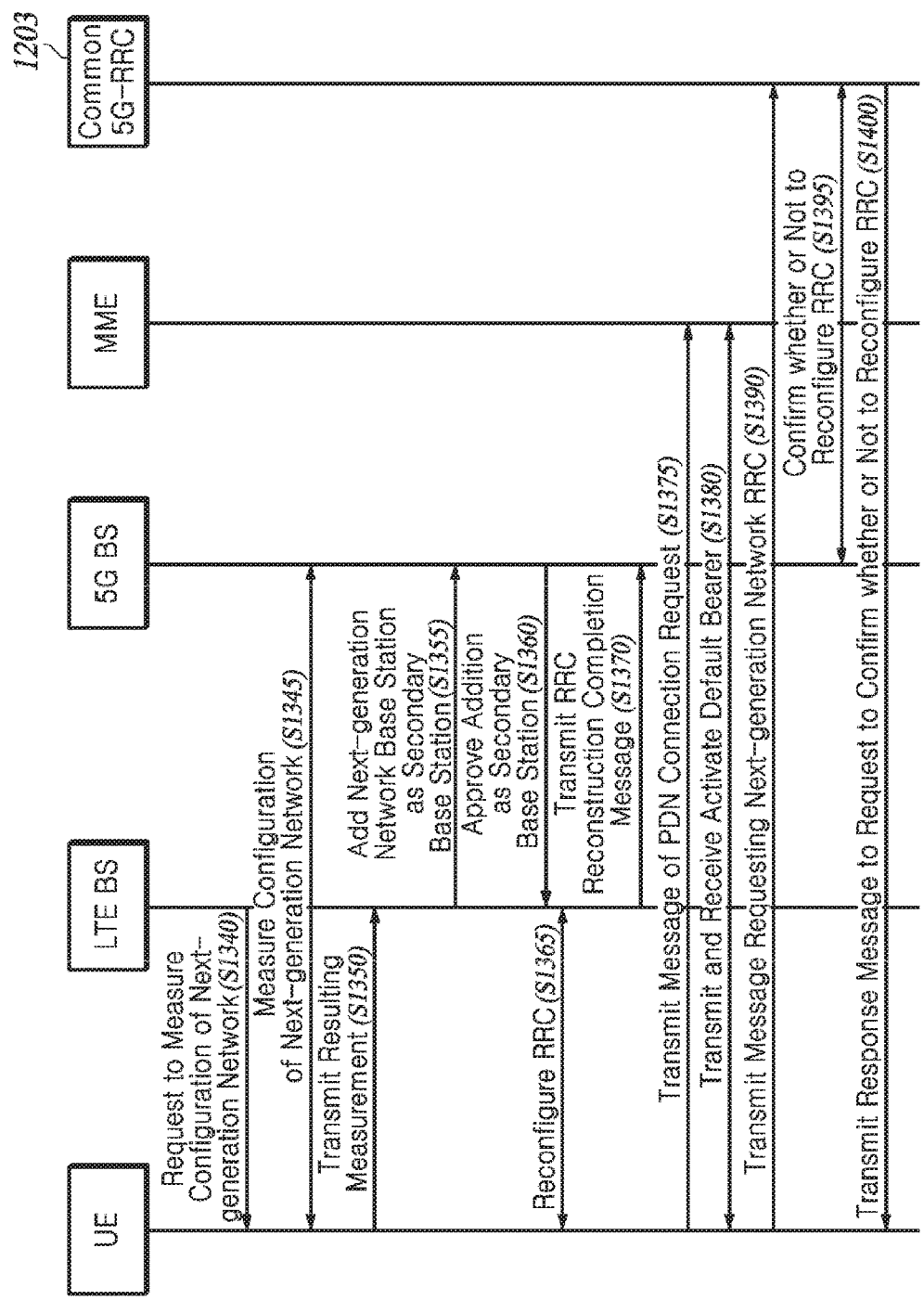

FIG. 12C is a flowchart of a process performed by a system architecture according to yet another embodiment of the present disclosure for transmission of information for utilizing a next-generation network over an existing network. Steps S1340 to S1370 of FIG. 12C are the same as Steps S1210 to S1240 of FIG. 12A, and the description thereof will be omitted.

The terminal 210 transmits a message of packet data network (PDN) connection request to the base station control node 240 (S1375). The message of PDN connection request may include Access Point Name (APN) of the next-generation network base station 230.

The terminal 210 and the base station control node 240 transmit and receive an activate default bearer between each other (S1380). The activate default bearer may include the IP address of the terminal 210 or Protocol Configuration Option (PCO, the address of the base station control node).

The terminal 210 transmits a message requesting the next-generation network RRC to the RRC management node 1203 (S1385). The message requesting the next-generation network RRC includes the PCID of the next-generation network base station 230 or the identifier of the terminal (UEID).

The RRC management node 1203 confirms whether or not to reconfigure the RRC at the next-generation network base station 230 (S1390). Through the internal communication with the next-generation network base station 230, the RRC management node 1203 confirms whether or not the RRC reconfiguration has been performed, whether or not the PCID of the next-generation network base station 230 matches, or whether or not the terminal identifier (UEID) matches.

The RRC management node 1203 transmits a response message to the request of the next-generation network RRC, to the terminal 210 (51395). The RRC management node 1203 transmits a response message to the request of the next-generation network RRC based on the result of confirmation with the next-generation network base station 230.

Although the steps in FIGS. 3 to 7 and FIGS. 12A to 12C are described to be sequentially performed, they merely instantiate the technical idea of some embodiments of the present disclosure. Therefore, a person having ordinary skill in the pertinent art could appreciate that various modifications, additions, and substitutions are possible by changing the sequences described in the respective drawings or by performing two or more of the steps in parallel, without departing from the gist and the nature of the embodiments of the present disclosure, and hence the steps in FIGS. 3 to 7 and FIGS. 12A to 12C are not limited to the illustrated chronological sequences.

The steps shown in FIGS. 3 to 7 and FIGS. 12a to 12c can be implemented as computer-readable codes on a computer-readable recording medium. The computer-readable recording medium includes any type of recording device on which data that can be read by a computer system are recordable. Examples of the computer-readable recording medium include a magnetic recording medium (e.g., a ROM, a floppy disk, a hard disk, etc.), an optically readable medium (e.g., a CD-ROM, a DVD, etc.), and the like, and also include one implemented in the form of a carrier wave (e.g., transmission through the Internet). Further, the computer-readable recording medium can be distributed in computer systems connected via a network, wherein computer-readable codes can be stored and executed in a distributed mode.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for controlling a base station in a mobile communication system including a plurality of heterogeneous networks, the apparatus comprising:
 a communication unit configured to receive, from a terminal, a network connection establishment message including information on support of dual connectivity using at least two different generation networks of the heterogeneous networks; and
 a control unit configured to determine whether to approve or disapprove dual connectivity by the terminal by using the information on the terminal and the received information on support of the dual connectivity using at least two different generation networks of the heterogeneous networks, and select one gateway for supporting the terminal based on the determined result, wherein the communication unit transmits the network connection establishment request message to the selected gateway, and wherein the control unit determines each maximum data transfer rate for the plurality of heterogeneous networks and transmits each maximum data transfer rate to the selected gateway.

2. The apparatus of claim 1, wherein the information on support of dual connectivity includes information on whether the terminal supports dual connectivity using at least two different generation networks of the heterogeneous networks, whether the terminal requests utilization of dual connectivity, or whether the terminal belongs to a service area for using dual connectivity.

3. The apparatus of claim 2, wherein the control unit approves support of dual connectivity by the terminal, when the terminal supports dual connectivity, the terminal requests support of dual connectivity, and the terminal belongs to the service area for using dual connectivity.

4. A base station apparatus in a mobile communication system including a plurality of heterogeneous networks, the base station apparatus comprising:

a communication unit configured to receive a connection establishment message, including information on support of dual connectivity from a terminal; and a control unit configured to determine, when the communication unit receives the connection establishment message, whether or not the control unit supports dual connectivity using at least two different generation networks of the heterogeneous networks, wherein the control unit determines each maximum data transfer rate for the plurality of heterogeneous networks and transmits each maximum data transfer rate to a selected gateway.

5. The base station apparatus of claim 4, wherein the information on support of dual connectivity includes information on whether the terminal supports dual connectivity using at least two different generation networks of the heterogeneous networks, whether the terminal requests utilization of dual connectivity, or whether the terminal belongs to a service area for using dual connectivity.

6. The base station apparatus of claim 5, wherein the control unit approves support of dual connectivity by the terminal, when the terminal supports dual connectivity, the terminal requests support of dual connectivity, and the terminal belongs to the service area for using dual connectivity.

* * * * *